(12) United States Patent
Biermann et al.

(10) Patent No.: US 8,979,699 B2
(45) Date of Patent: Mar. 17, 2015

(54) PLANETARY GEAR SYSTEM, PLANETARY DIFFERENTIAL AND GEAR SYSTEM WITH THE PLANETARY DIFFERENTIAL

(75) Inventors: Thorsten Biermann, Wachenroth (DE); Tomas Smetana, Herzogenaurach (DE); Florian Doerrfuss, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 11 days.

(21) Appl. No.: 13/876,079

(22) PCT Filed: Jul. 14, 2011

(86) PCT No.: PCT/EP2011/062073
§ 371 (c)(1),
(2), (4) Date: Mar. 26, 2013

(87) PCT Pub. No.: WO2012/041551
PCT Pub. Date: Apr. 5, 2012

(65) Prior Publication Data
US 2013/0190130 A1    Jul. 25, 2013

(30) Foreign Application Priority Data
Sep. 30, 2010  (DE) .................. 10 2010 047 143

(51) Int. Cl.
F16H 48/10 (2012.01)
F16H 1/46 (2006.01)
F16H 48/11 (2012.01)
F16H 55/08 (2006.01)

(52) U.S. Cl.
CPC ............... *F16H 1/46* (2013.01); *F16H 48/11* (2013.01); *F16H 55/0826* (2013.01)
USPC .......................................... 475/252; 475/248

(58) Field of Classification Search
USPC .................................................. 475/248, 252
See application file for complete search history.

(56) References Cited

U.S. PATENT DOCUMENTS

| | | | |
|---|---|---|---|
| 1,601,750 A | 10/1926 | Wildhaber | |
| 1,767,867 A * | 6/1930 | Wildhaber | ............... 74/466 |
| 3,338,110 A | 8/1967 | Iyoi | |
| 2009/0215576 A1* | 8/2009 | Nishiji | ............... 475/252 |
| 2011/0245012 A1 | 10/2011 | Biermann et al. | |

FOREIGN PATENT DOCUMENTS

| | | |
|---|---|---|
| DE | 102008061946 A1 | 6/2010 |
| DE | 102009032286 A1 | 6/2010 |
| GB | 266163 A | 2/1927 |

* cited by examiner

*Primary Examiner* — Derek D Knight
(74) *Attorney, Agent, or Firm* — Davidson, Davidson & Kappel, LLC

(57) ABSTRACT

A planetary gear system having at least two planetary steps, each of which is made up of at least one set of planets and one sun, whereby the teeth of the gearwheels in the planetary drive mesh with each other in such a way that, in each of the meshing points, at least one first tooth on a first toothing of first teeth positively engages into a tooth gap of a second toothing of second teeth. First teeth of the first toothing have a tooth flank profile concavely arched, and second teeth of the second toothing have a tooth flank profile convexly arched, so that the tooth flanks in contact with each other are arched in the same directions, at least when in contact.

3 Claims, 4 Drawing Sheets

PLANETARY GEAR SYSTEM, PLANETARY DIFFERENTIAL AND GEAR SYSTEM WITH THE PLANETARY DIFFERENTIAL

The present invention relates to a planetary gear system having at least two planetary steps, each of which is made up of at least one set of planets and one sun, whereby the teeth of the gearwheels in the planetary drive mesh with each other in such a way that, in each of the meshing points, at least one first tooth of a first toothing consisting of first teeth positively engages into a tooth gap of a second toothing consisting of second teeth, a process in which a first flank of the first tooth touches at least a second flank of a second tooth that delimits one side of the tooth gap on the second toothing in at least one point of tooth contact. The invention also relates to a planetary differential with a planetary gear system and to a gear system with the planetary differential.

BACKGROUND

German patent application DE 10 2009 032 286 A1 describes a planetary differential having a planetary gear system of the generic type. The planetary differential has two planetary steps, each of which is made up of a set of planets and a sun. The suns and the planets are gearwheels with face gears which are configured as involute gears. The planetary gearwheels are rotatably mounted on planet pins so that they can rotate around the sun at a radial distance from the main axis of the planetary differential and their teeth mesh with the teeth of the sun gearwheel.

The planetary pins are affixed to a planet carrier. The teeth of the planetary gearwheels of one set and the teeth of each sun wheel belonging to the planetary step mesh in such a way that, in each of the meshing points, at least one first tooth on a first toothing consisting of first teeth distributed around the circumference positively engages into a tooth gap of a second toothing consisting of second teeth. In this process, a first flank of the first tooth touches at least a second flank of a second tooth that, together with another second tooth, delimits the tooth gap in the circumferential direction of the gearwheel. The teeth touch each other at the point of tooth contact, as is normally the case with face gears. "Meshing of the teeth" refers here to the positive movable connection of the toothing of a gearwheel to a mating gearwheel through the reciprocal meshing of teeth of the gearwheel into tooth gaps of the mating gearwheel and vice versa.

Such planetary differentials are highly suitable for installation into transfer gears. Moreover, the planetary sets, planetary gear systems and planetary differentials are extremely well-suited for use in drive units powered by electric motors and employed for hybrid drive trains. Such a drive unit is described in German patent application DE 10 2008 061 946 A1. The drive unit has a main drive and a secondary drive. The main drive is connected by gears to a planetary differential via a planetary set. A planetary differential is essentially characterized by two sets of pinion gears that are each formed by a set of planetary gears. Each of these pinion gears is mounted so that it can rotate on a planetary pin around an axis of rotation that corresponds to the axis of symmetry of the planetary pin. The axes of rotation of the planet gears are oriented parallel to the axis of rotation of the driven wheels, in other words, parallel to the axes of rotation of the sun wheels of the planetary differential. The coaxial axes of rotation of the sun gears are concentric to the differential and lie on the main axis of the drive unit. The main axis of the drive unit also combines the axes of rotation of the drive shafts of the main and secondary drives. The differential shafts of the planetary differential are sun wheels that are each connected, for example, to a driven shaft that leads to a wheel of a vehicle. The teeth of each of the sun wheels mesh with the teeth of one of the sets of pinion planetary gears.

By means of the secondary drive, a superimposed gear can be employed to additionally apply torques into the planetary differential and to influence the distribution to the differential wheels. In this case, the main drive and the secondary drive are electric motors that are arranged coaxially with respect to each other. The superimposed gear is formed by three planetary drives coupled to each other. Such drive units can be used either independently of other drive sources, for example, independently of internal combustion engines, or else together with them.

In the generic planetary differentials described in German patent application 10 2009 032 286 A1 and employed in a generic drive unit according to German patent application DE 10 2008 061 946 A1, the toothing of the first planetary gearwheels meshes with the toothing of the second planetary gearwheels. Here, the number of teeth of the first planetary gearwheels preferably matches the number of teeth of the toothing of the second planetary gearwheels, but it can also be different. At the same time, the toothing of the planetary gearwheels of one of the sets of planetary gearwheels meshes with the toothing of only one sun gearwheel, without the toothing of the planetary gearwheels of this set meshing with the toothing of the other sun gearwheel. In order for this to be possible, the planetary gearwheels of one set have to be "longer", that is to say, axially wider than the teeth of the planetary gearwheels of the other set, and they have to axially overlap beyond the other sun gearwheel without touching it.

SUMMARY OF THE INVENTION

Since, for purposes of meshing with the teeth of the shorter planetary gearwheels, the longer planetary gearwheels have to axially overlap beyond the one sun gearwheel without touching it, the axially overlapped sun gearwheel has to have a smaller number of teeth, in other words, a smaller diameter, than the adjacent sun gearwheel. However, as an alternative and preferably, the toothing of the axially overlapped sun gearwheel has the same number of teeth as the other gearwheel, but it is designed with a smaller tip circle. This case presupposes the same number of teeth and the same diameter of the planetary gearwheels of both sets with respect to each other.

The different tip circle diameters of the sun gearwheels can be obtained by addendum modification, a familiar measure in the technical world. The point of tooth contact of the sun gearwheels with the larger tip circle here can be achieved by positive addendum modification and correspondingly, the point of tooth contact of the smaller sun gearwheels in the tip circle can be achieved by negative addendum modification. The tip circle is an imaginary circle that externally surrounds the teeth of a toothing having teeth of the same size. Accordingly, the tip circle diameter is the outer diameter of such a face gear. Starting at the axis of rotation or rotational axis, it determines the space requirement of a gearwheel in all radial directions. At the same time, the axial distance from the overlapped sun gearwheel to the planetary gearwheel with which it meshes is smaller, so that the short gearwheels can mesh with it. This case presupposes matching gear ratios between the planetary gearwheels of the first set and the first sun gearwheel as well as between the planetary gearwheels of the second set and the second sun gearwheel.

It is an object of the present invention to provide planetary gear systems, planetary differentials with such planetary gear systems and gear systems with such a planetary differential, all of which have a compact design and all of which exhibit a high load-bearing capacity of the toothing of their gearwheels.

The teeth of the first toothing have a tooth flank profile that, as seen in a cross section through the toothing when the teeth mesh, is concavely arched. The teeth of the second toothing, in contrast, have a tooth flank profile that is convexly arched in the same cross section. The tooth flanks of the first tooth and of the second tooth, which are in contact with each other, are correspondingly arched in the same directions, at least when they are in contact with each other.

As described above, the teeth of the toothing of the one gearwheel have concave flank geometries. The concave flank geometries either run continuously, in the ideal case with a circular-arc contour, or else the flank lines have an irregular course, arching inwards into the appertaining tooth, so that a the contour of the tooth gap, as seen in the cross section of the gearwheel, appears between two tooth flanks situated opposite from each other, for example, in the form of circular-arc profiles, alternatively as gothic-arch profiles or profiles with an oval shape (semi-ellipse as seen over the long axis halves). The contour of the flank profile of the teeth itself appears accordingly with a circular-arc shape, a cup shape or a bell shape, as seen in the same cross section. In this context, it is not ruled out that the tooth crests and the gaps at the tooth root are flat or flattened with a circular-arc shape, that is to say, that the appertaining profile appears to have been cut off at its tip, so to speak.

The teeth of the other mating toothing that mesh with the tooth gaps of the above-mentioned gearwheel have convex flank geometries. These convex flank geometries are either continuously or non-continuously arched outwards, so that the contour of the flank profile of the teeth in the cross section of the gearwheel appears, for instance, in the form of circular-arc profiles (classic form of Novikov toothing), alternatively as gothic-arch profiles or profiles with an oval shape (semi-ellipse). The contour of the tooth gap, as seen in the same cross section, between two of the teeth situated opposite from each other appears accordingly with a circular-arc shape, a cup shape or a bell shape. Here, again, it cannot be ruled out that the tooth crests and the gaps at the tooth root are flat or flattened with a circular-arc shape, that is to say, that the appertaining profile appears to have been cut off at its tip, so to speak.

It is characteristic for this type of toothing, referred to in its classic form as Wildhaber-Novikov gears, that a part of a concave tooth flank profile of the teeth of a gearwheel always engages with a part of a convex tooth flank profile of a tooth of the mating gearwheel. In the cross section perpendicular to the axis of rotation of the gearwheels, as seen through both gearwheels when their teeth mesh, the flank lines—which are in contact with each other when the teeth mesh—of the tooth flank profile of the flanks of the concave and convex teeth are thus arched in the same direction, so that the flanks of the convex outwards arched teeth apparently fit into the flanks of the concave inwards arched teeth. Such a combination yields favorable pressure conditions between the teeth. A higher load-bearing capacity can be expected for such gear systems in terms of the flank pressure. Moreover, such flank contact promotes the self-centering of the suns with respect to the main axis of a planetary gear system, when, as a rule, it is supported on an odd number of planetary gears that are arranged at a uniform circumferential distance. At the same module, the tooth height of such toothing is less than, for instance, that of involute gears. For this reason, the weight of such planetary gear systems is less than that, for example, with involute gears.

Embodiments of the invention provide for the following:

In at least one of the planetary steps, the sun is a gearwheel with teeth that have a concave tooth flank profile. Accordingly, the planets of the set are each mating gearwheels with teeth that have a convex tooth flank profile.

The planetary gear system has two planetary steps in which the teeth of the planet gears of one planetary step mesh with the teeth of the gearwheels of the second planetary step. The planets inside a set of planets of the first planetary step are gearwheels with teeth that have a concave tooth flank profile. The planets of the other set of planets have mating gearwheels that have a convex tooth flank profile.

The planetary gear system has two planetary steps in which the teeth of the first planets of a first planetary step mesh with the teeth of the gearwheels of a second planetary step. The planets inside the set of planets of the first planetary step are gearwheels with teeth that have a concave tooth flank profile. The second planets of the second planetary step have mating gearwheels that have a convex tooth flank profile. The teeth of the first planets mesh with the teeth of a first sun that has a mating gearwheel with teeth that have a convex tooth flank profile. The teeth of the second planets mesh with the teeth of a second sun that has a gearwheel with teeth that have a concave tooth flank profile.

A planetary differential having a planetary gear system has a planet carrier as a differential cage and as a drive shaft (sum shaft of the planetary drive). Moreover, the planetary differential is formed by two sets of planets and two suns. The planets of the sets of planets are jointly mounted on the planet carrier, which can also consist of several parts but whose individual parts are coupled to each other so as to be torque-free. The sun wheels, as differential shafts of the differential, are coupled to driven shafts, each of which leads, for instance, to the wheel of a vehicle.

In the planetary differential, preferably both planetary steps, namely the one with the first set and the first sun, and the one with the second set and the second sun, are combined with the first toothing and the second toothing The suns of the planetary differential preferably have a shared axis of rotation that corresponds to the main axis of the differential.

A gear system that can be a transfer gear with one drive element and three driven elements. As an alternative, the gear system is an integral part of a drive unit into which at least one electric motor is integrated. The gear system has a planetary differential in the configuration according to the invention and is correspondingly formed by two sets of planets and one sun per set. Both sets of planets are mounted on a shared carrier, which can also consist of several parts, but whose individual parts are coupled to each other via appropriate means so as to be torque-free. The sun wheels are coupled to driven shafts, each of which leads, for instance, to a wheel of a vehicle. Moreover, the gear system is provided with a third planetary step. This third planetary step is formed by a third set of planets whose teeth mesh with the teeth of a third sun. The planet carrier can be driven via the third planetary step. The planet gears of the third set are rotatably mounted on the same planet carrier as the sets of planetary steps of the planetary differential. At least one, alternatively two or three, of the planetary steps have at least a combination of toothing that has concave and convex tooth flank profiles.

DETAILED DESCRIPTION

Figure 1:
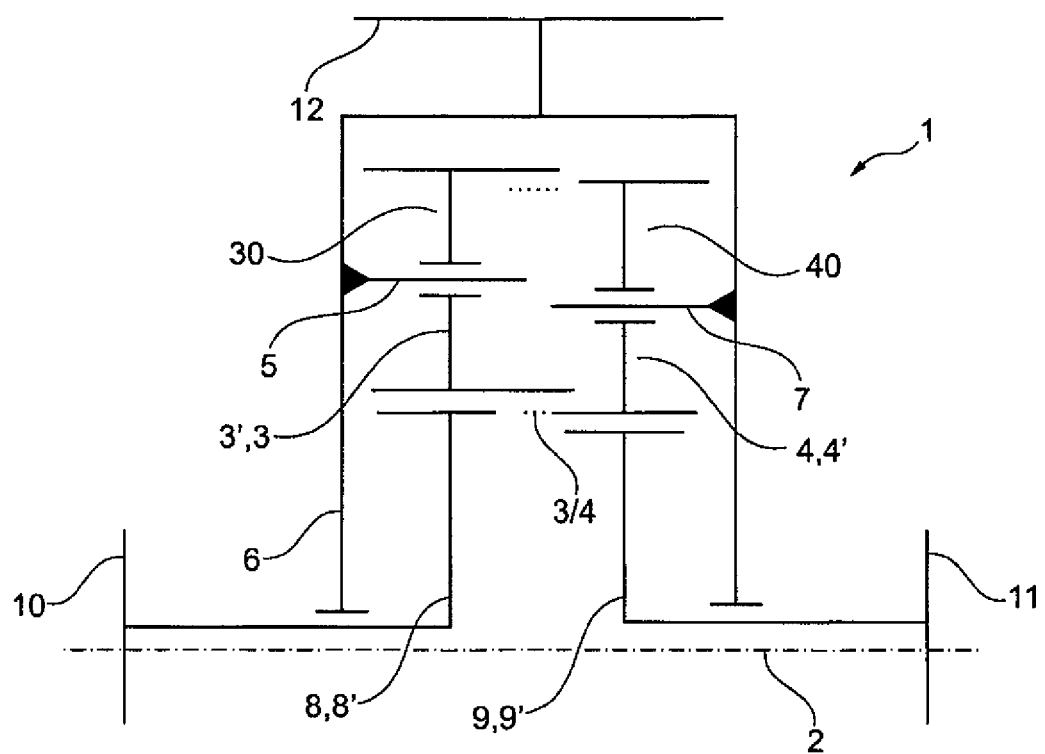
FIG. 1 shows an embodiment of a planetary differential in a simplified, schematic half-view along the main axis of the planetary differential.

FIG. 1 shows an embodiment of a planetary differential 1 according to the invention, in a simplified, schematic half-view along the main axis 2 of the planetary differential 1. The planetary differential 1 has two planetary steps 30, 40, each with a set of planets 3, 4, respectively, of which only one planet 3/gearwheel 3' or planet 4/gearwheel 4' is shown. The planets 3 are each rotatably mounted on a pin axis 5 of a planetary pin (not shown here), which is fixed to a planet carrier 6 at a first radial distance from the main axis 2. The planets 4 are each rotatably mounted on a pin axis 7 of a planetary pin (not shown here), which is fixed to the planet carrier 6 at a second radial distance from the main axis 2.

The teeth of a planet 3 always mesh with the teeth of a planet 4, as indicated by the broken line 3/4. The teeth of each of the short planets 3 mesh with the teeth of a sun 8 but not with the teeth of a sun 9. The suns 8 and 9 are gearwheels 8' and 9', and only half of them is shown. The teeth of each of the long planets 4 mesh with the teeth of the sun 9 but not with the teeth of the sun 8. The suns 8 and 9 can be rotated relative to the planet carrier 6 and relative to each other, and are each connected to a driven shaft 10 or 11. The axis of rotation of the suns 8 and 9 corresponds to the main axis 2. A drive element 12, which can optionally be a bevel gear, a spur gear, a belt or chain gear is installed on the planetary differential and is affixed to the planet carrier 6.

Figure 2:
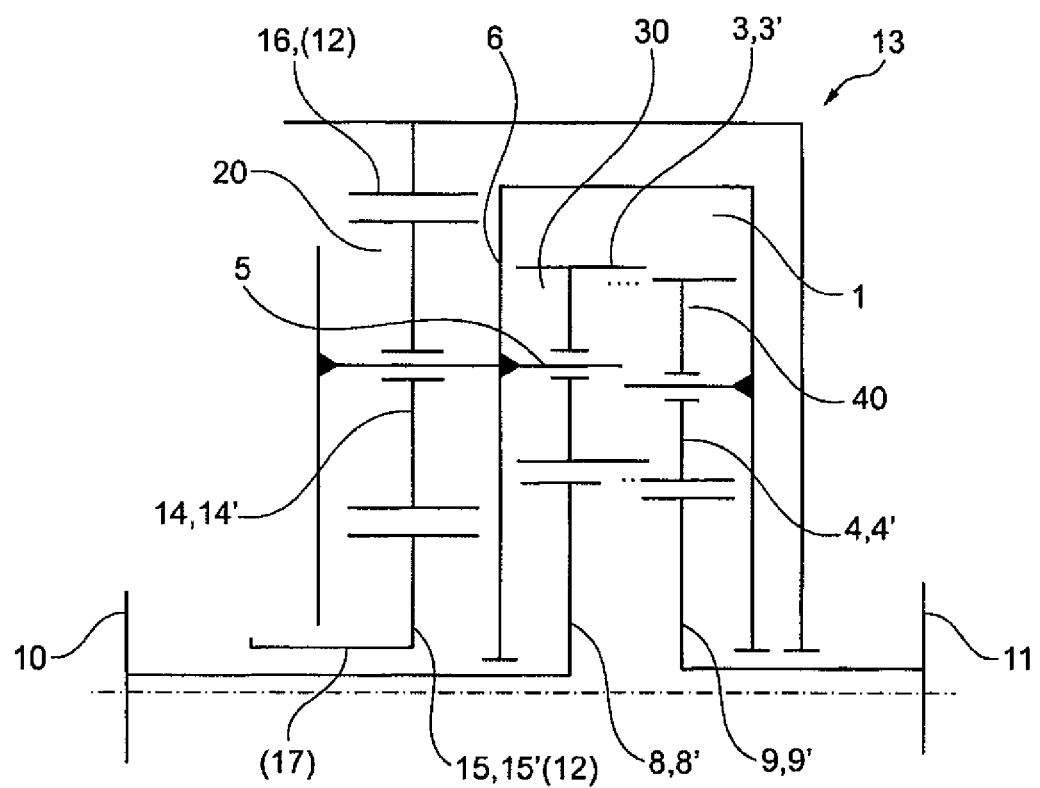
FIG. 2 shows an embodiment of a gear system with a planetary differential in a simplified schematic view along the main axis of the planetary differential or along the main axis of the gear system.
Figure 3:
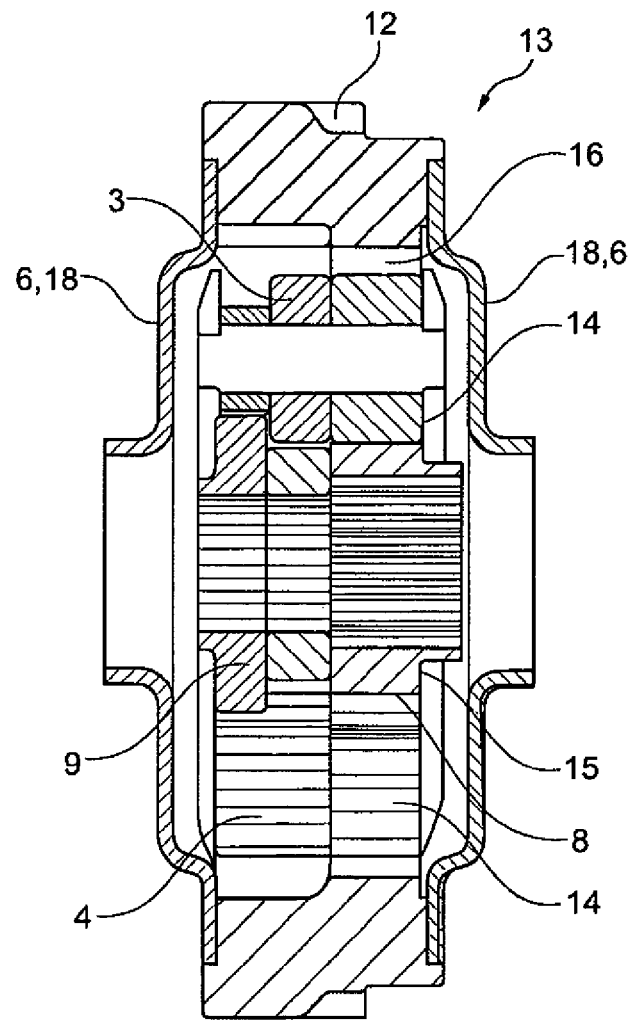
FIG. 3 shows the planet carrier formed by two bowl-shaped elements which axially secure a combination element between them.

FIG. 2 shows an embodiment of a gear system 13 according to the invention, with a planetary differential 1 according to FIG. 2 in a simplified schematic view along the main axis 2 of the planetary differential 1 or along the main axis 2 of the gear system 13. FIG. 3 shows such a gear system 13 in a longitudinal section along its main axis 2. In addition to the planetary steps 30 and 40 of the planetary differential 1, the gear system 13 also has another planetary step 20. The planetary step 20 is formed by a set of planets 14, of which only one planet 14, which is a gearwheel 14', is shown. The teeth of the planets 14 mesh with the teeth of a third sun 15. The sun 15 is a gearwheel 15', only half of which is shown. Together with the short planets 3, the planets 14 can rotate around the pin axis 5 on a planetary pin on the planet carrier 6. Moreover, the teeth of planets mesh with the teeth of an internal gearwheel 16.

In the depiction according to FIG. 2, the sun 15 or the internal gearwheel 16, optionally one or the other, are the drive element 12 of the gear system 13. When the gear system 13 is a transfer gear, the internal gearwheel 16 is the drive element 12. In this case, the sun 15 is coupled to an additional driven shaft 17 which leads, for example, from the transfer gear to an axle drive. In a drive unit having at least one electric motor, either one of the elements, namely, either the sun 15 or the internal gearwheel 16, can be the drive element 12, or else, in the drive unit, the sun 15 and the internal gearwheel 16 can both be the drive elements 12 of the gear system.

In the depiction according to FIG. 3, the planet carrier 6 is formed by two bowl-shaped elements 18 which axially secure a combination element 19 between them. The internal gearwheel 16 and a drive element 12 in the form of a spur gear are combined as a single part on the combination element 19. At the same time, a spacer and an attachment flange are combined on the combination element 19. The gear system 13 according to FIG. 3 can be employed as a transfer gear in which the suns 8, 9 and 15 can each be placed onto a driven shaft.

Figure 4A:
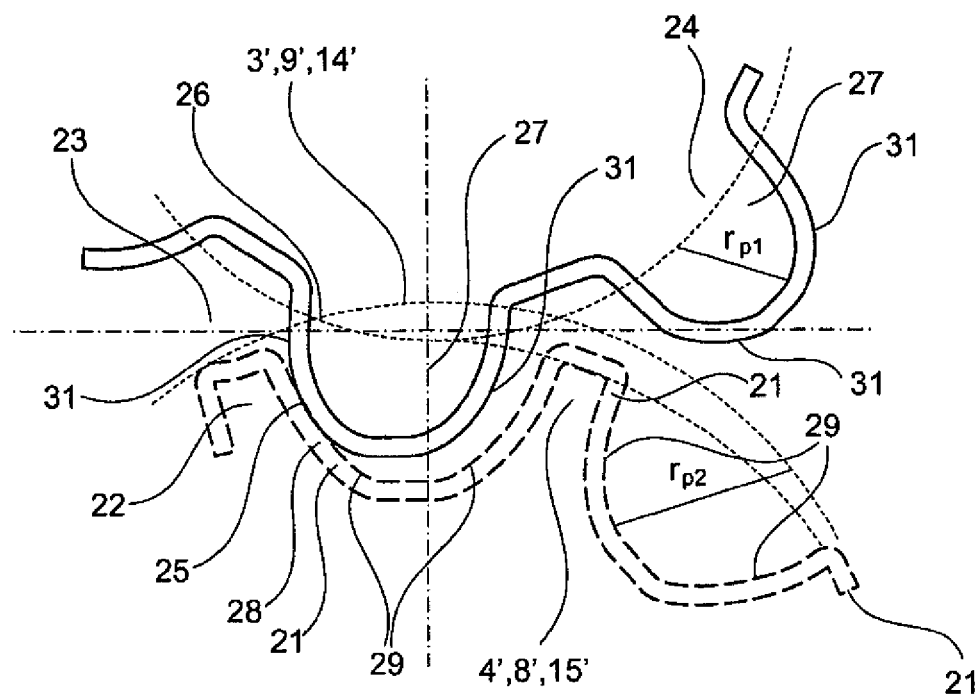
FIG. 4a shows a detail of a cross section in a cross-sectional plane perpendicular to the main axis.
Figure 4B:
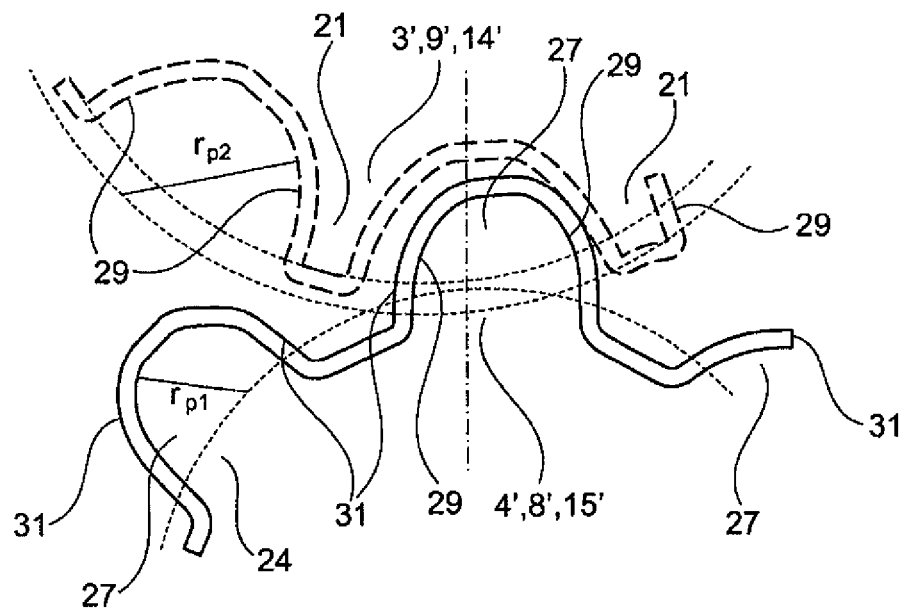
FIG. 4b each show a detail of a cross section in a cross-sectional plane perpendicular to the main axis 2.

FIGS. 4a and 4b each show a detail of a cross section in a cross-sectional plane perpendicular to the main axis 2, with the possible pairings of gearwheels: gearwheel 3' with gearwheel 4' and concurrently with gearwheel 8', gearwheel 4' with gearwheel 3' and concurrently with gearwheel 9' and/or gearwheel 14' with gearwheel 15' of the embodiments described above and illustrated in FIGS. 1 to 3.

The teeth of the gearwheels 3', 4', 8', 9', 14' and 15' mesh with each other in such a way that, at each of the meshing points, at least a first tooth 21 positively engages with several circumferentially distributed teeth 21 on a first toothing 22 into a tooth gap 23 of a second toothing 24. A first flank 25 of the first tooth 21 touches at least a second flank 26 of a second tooth 27 that delimits one side of the tooth gap 23 on the second toothing 24 in at least one point of tooth contact 28. The first teeth 21 of the first toothing 22 have a tooth flank profile 29 that is concavely arched. The second teeth 27 of the second toothing 24 each have a tooth flank profile 31 that is convexly arched. The flanks 25 and 26 of the first tooth 21 and of the second tooth 27 which touch in the point of tooth contact 28 are correspondingly arched in the same direction, at least in the point of tooth contact 28; in the depiction according to FIG. 4a, for example, towards the left in the drawing and, in the depiction according to FIG. 4b, towards the right in the drawing.

As can be seen in the depiction according to FIG. 4a, the first teeth 21 of the first toothing 22 having a concave tooth flank profile 29 are formed on the gearwheels 4', 8' and 15'. The second teeth 27 of the second toothing 24, which each have a convex tooth flank profile 31, are supported by the gearwheels 3', 9' and 14'. As can be seen in FIG. 4b, the first teeth 21 of the first toothing 22 having a concave tooth flank profile 29 are formed on the gearwheels 3', 9' and 14'. The second teeth 27 of the second toothing 24, which have a convex tooth flank profile 31, are supported by the gearwheels 4', 8' and 15'.

REFERENCE NUMERALS 1 planetary differential
2 main axis
3 planet
3' gearwheel
4 planet
4' gearwheel
40 planetary step
5 pin axis
6 planet carrier
7 pin axis
8 sun 8' gearwheel
9 sun
9' gearwheel
10 driven shaft
11 driven shaft
12 drive element
13 gear system
14 planet
14' gearwheel
15 sun
15' gearwheel
16 internal gearwheel
17 driven shaft
18 bowl-shaped elements
19 combination element
20 planetary step
21 tooth
22 toothing
23 tooth gap
24 toothing
25 tooth flank
26 tooth flank
27 tooth
28 point of tooth contact
29 tooth flank profile
30 planetary step
31 tooth flank profile

The invention claimed is:

1. A planetary differential comprising;
a planetary gear system including at least two planetary steps, each planetary step including at least one set of planets and one sun, teeth of gearwheels in the planetary gear system meshing with each other in at meshing points in such a way that, in each of the meshing points, at least one first tooth on a first toothing of first teeth positively engages into a tooth gap of a second toothing of second teeth, a first flank of the first tooth touching at least a second flank of a second tooth of the second toothing that delimits one side of the tooth gap on the second toothing in at least one point of tooth contact, the first teeth of the first toothing having a tooth flank profile that, as seen in the cross section through the toothing when the teeth mesh, is concavely arched, and in that the second teeth of the second toothing have a tooth flank profile convexly arched in the same cross section, so that the tooth flanks of the first tooth and of the second tooth, which are in contact with each other, are arched in the same directions, at least when they are in contact with each other; and
at least one planet carrier, the planetary gear system including a first set of planets and a second set of planets, whereby the firsts and second sets of planets are each rotatably mounted on the planet carrier, as well as a first sun and a second sun which are each operationally connected to a driven shaft of the planetary differential, and the planets of the first set, together with the first sun, form a first planetary step, and thereby they mesh with the teeth of the first sun, the planets of the second set, together with the second sun, forming a second planetary step, and thereby they mesh with the teeth of the second sun, and whereby the teeth of each of the planets of the first set mesh with the teeth of one of the planets of the second set, the planetary gear system having at least a third planetary step including a third set of planets whose teeth mesh with the teeth of a third sun, the planet carrier drivable via the third planetary step, and whereby the planetary gears of the third set are rotatably mounted on the planet carrier.

2. The gear system as recited in claim 1 wherein the third planetary step has at least one gearwheel of the gearwheels with the first toothing and at least one gearwheel of the gearwheels with the second toothing.

3. The gear system as recited in claim 2 wherein the first planetary step and the second planetary step have at least one gearwheel of the gearwheels with the first toothing and at least one gearwheel of the gearwheels with the second toothing.

* * * * *